L. KIRK.
Car Heater.

No. 5,325.

2 Sheets—Sheet 1.

Patented Oct. 9, 1847.

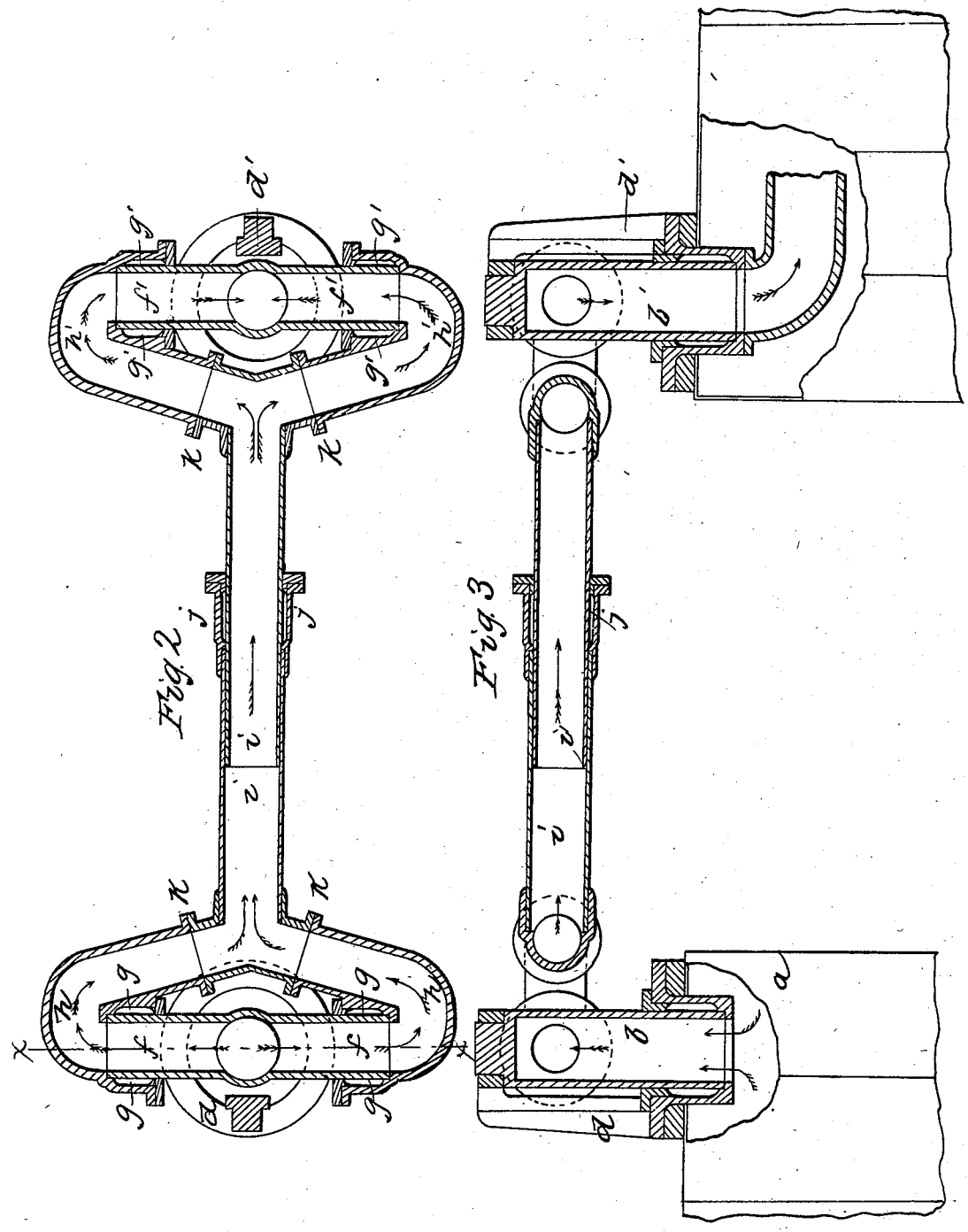

UNITED STATES PATENT OFFICE.

LEWIS KIRK, OF READING, PENNSYLVANIA.

JOINTED PIPE FOR STEAM, &c.

Specification of Letters Patent No. 5,325, dated October 9, 1847.

*To all whom it may concern:*

Figure 1:
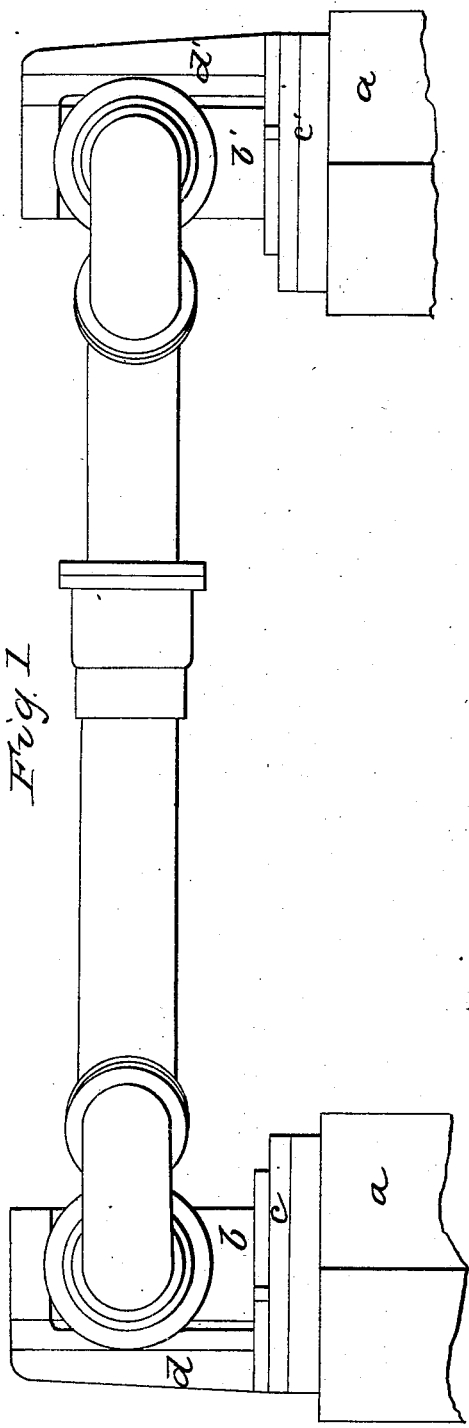
Figure 4:
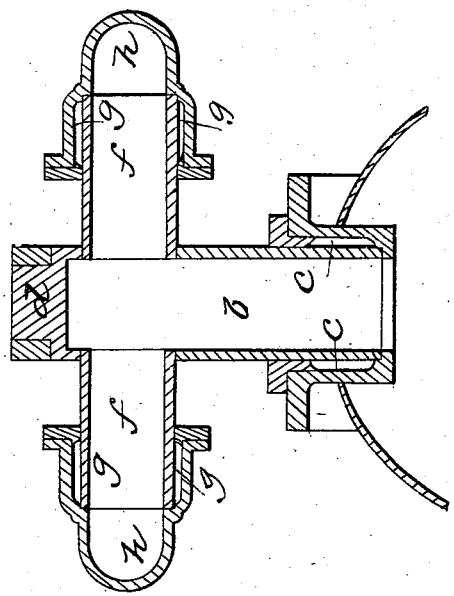

Be it known that I, LEWIS KIRK, of Reading, in the county of Berks and State of Pennsylvania, have invented a new and useful improvement in the method of connecting steam-pipes for locomotive steam-engines by means of sliding and turning joints that the engines and boiler may be on separate carriages, and that the following is a full, clear, and exact description of the principle or character which distinguishes it from all other things before known and of the manner of making, constructing, and using the same, reference being had to the accompanying drawings, making part of this specification, in which:

Figure 1 is an elevation of the pipes showing the connection between the boiler and engine; Fig. 2 a horizontal section; Fig. 3, a vertical section; and Fig. 4, a cross vertical section taken at the line (X X) of Fig. 2.

The same letters indicate like parts in all the figures.

The object of my invention is to connect the steam boiler of a locomotive engine, placed on one carriage with the engine placed on another carriage, that the two carriages, which are connected together in the usual or any desired manner of connecting carriages, may be free to vibrate in any direction, by so constructing the connecting pipe or pipes as to admit of these motions without leaking or liability to break. And the nature of my invention consists in making the pipe which is in two parts, one sliding on the other, with the outer extremity of each part provided with two curved branches connected by means of packed turning joints with a vertical pipe having a closed journal at the upper end, and an open packed journal at the other which forms the connection, in one of them, with the steam chamber of the boiler, and in the other with the steam chest of the engine; in this way the sliding of the two parts on one another will admit of the vibration of the two carriages toward and from one another, the packed joints of the branch pipes with the vertical pipe will admit of a free vibration vertically, and the turning of the short vertical pipes on their two journals will admit of the free vibration of the two carriages horizontally, while the union of the three will admit of vibrations in any direction, the curved branches of each part of the journaled pipe, which form the connection with the vertical pipes, effectually preventing any tendency to break or strain the joints in these parts, while the connection of the two vertical pipes with the steam chamber and chest by the two journals effectually protect them against all tendency to break or strain.

In the accompanying drawings (*a*) represents the steam chest of a steam boiler, supposed to be placed on one carriage, and (*a'*) the steam chest of the engine supposed to be placed on another carriage. To the top of each of these is fitted the hollow journal of a vertical steam pipe (*b, b'*), the joints being made steam tight by means of stuffing boxes (*c, c'*). The upper end of these short pipes is closed and provided with a journal that works in a bracket, standard or brace (*d, d'*) to insure the proper position of these pipes to prevent them from being strained by the motion of the two carriages when the two pipes are connected together as hereafter described. Each of these pipes is provided with two short branch pipes (*f, f,*) (*f' f''*) opposite to each other and in the same line, and their outer ends are received and fitted by stuffing boxes (*g, g*), (*g', g'*) into the ends of the curved branches (*h, h, h', h',*) of the main pipe (*i, i'*) which is made in two parts one sliding in the other with a stuffing box (*j*) to insure a tight joint and yet admit of sliding. The curved branches (*h, h, h', h'*) are made separate and connected with the main pipe (*i, i'*) by means of flanches (*k, k, k', k'*) so that they can be slipped onto the branches (*f, f'*) of the vertical pipes and then bolted, the ends of the branches (*f, f'*) fitting against shoulders in the curved branches (*h, h'*) to insure an accurate fit to prevent lateral play, and yet admit of the free vibration of the main pipe in a vertical direction on the branch pipes (*f, f'*), the stuffing boxes rendering the joints steam tight. The lower boxes in which the open end of the vertical pipes turn have a shoulder at the bottom on which the end of the pipes rest and on which they turn; the stuffing boxes are then put on to render the joints steam tight and yet permit the pipes to turn, while the journals at the upper end, working in the brackets or standards, will sustain the pipes against all strain. In this way it will be observed that the two carriages, one carrying the boiler and the other the engine, can move toward and from one another by virtue of the sliding joint in the main pipe, and to the extent of the lap of this joint or nearly so—they can vibrate vertically to follow the undulations of the road by means of the turning joints which form the connections of the main pipe with the two vertical pipes—they can vibrate laterally to follow the curves of the road and to admit of the lateral surging to which all railroad carriages are exposed, and they can vibrate in any direction compounded of the longitudinal, horizontal and vertical by virtue of the slide and the vertical and horizontal turning joints; and what is of great importance in structures and connections of this kind, the forming of the connections of the main pipe with the vertical pipes on both sides of these, together with the support of the vertical pipes in boxes at top and bottom, will give effectual protection against the breaking or straining of the joints in all directions, while the steam passages are retained of the required and the same size in all positions of the connections—results which have not been attained by any other mode of construction and arrangement heretofore known.

It will be obvious from the foregoing that the water pipe for returning the hot water from the engine to the boiler, if the steam be condensed for that purpose in the engine, can be constructed on the plan above described. In short, pipes for any purpose connecting two bodies, to admit of their vibrating, may be constructed on this plan.

I do not claim as my invention simply connecting the boiler and engine of a locomotive which are placed on separate carriages by means of a pipe made in two parts and connected by turning and sliding joints, as this has been essayed; but—

What I do claim as my invention and desire to secure by Letters Patent is—

Connecting the main pipe at each end, by means of two branches on opposite sides, when this is combined with the sliding joint in the main pipe, substantially as described, whereby the connections of the main pipe with the vertical pipes, and the vertical pipes with the boiler and engine, or other vessels to be connected, are sustained against any tendency to strain or break, and the openings or passages are retained of the same required size at all times, while the two bodies thus connected are free to vibrate in all directions without interrupting the flow through the pipe, as described.

LEWIS KIRK.

Witnesses:
ALEX S. FEATHER,
WILLIAM BETZ.